(12) United States Patent
Krupp et al.

(10) Patent No.: US 12,255,526 B2
(45) Date of Patent: Mar. 18, 2025

(54) POWER CONVERTER WITH COMMON MODE FILTER

(71) Applicant: Siemens Aktiengesellschaft, Munich (DE)

(72) Inventors: Henrik Krupp, Erlangen (DE); Stefan Steinmüller, Erlangen (DE); Michael Kopf, Feucht (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 153 days.

(21) Appl. No.: 18/040,657

(22) PCT Filed: Jun. 8, 2021

(86) PCT No.: PCT/EP2021/065294
§ 371 (c)(1),
(2) Date: Feb. 6, 2023

(87) PCT Pub. No.: WO2022/028754
PCT Pub. Date: Feb. 10, 2022

(65) Prior Publication Data
US 2023/0318439 A1    Oct. 5, 2023

(30) Foreign Application Priority Data
Aug. 4, 2020 (EP) .................................... 20189369

(51) Int. Cl.
*H02M 3/335*    (2006.01)
*H02M 1/00*    (2006.01)
*H02M 1/12*    (2006.01)

(52) U.S. Cl.
CPC ......... *H02M 1/123* (2021.05); *H02M 1/0064* (2021.05); *H02M 3/33576* (2013.01)

(58) Field of Classification Search
CPC . H02M 1/123; H02M 1/0064; H02M 3/33576
See application file for complete search history.

(56) References Cited

U.S. PATENT DOCUMENTS 8,228,019 B2 *  7/2012  Higuchi ................ H02M 1/126
                                                            318/722
10,476,464 B2 * 11/2019  Rambaud ............. H03H 7/0115
(Continued)

FOREIGN PATENT DOCUMENTS

DE    295 06 951     6/1995
EP    1 971 016      9/2008
(Continued)

OTHER PUBLICATIONS

Search Report for International Application No. PCT/EP2021/065297, 11 pages, Jul. 23, 2021.
(Continued)

*Primary Examiner* — Adolf D Berhane
(74) *Attorney, Agent, or Firm* — Slayden Grubert Beard PLLC (57) ABSTRACT

Various embodiments of the teachings herein include a power converter. The power converter may include: a converter for converting between a first electrical voltage and a second electrical voltage; a common mode filter having a common mode transformer; and a second winding connected to a frequency-selective passive damping circuit arranged on a common core. The common mode transformer has at least two first windings arranged in the same direction on the common core and coupled in series into electrical conductors connected to the converter device.

10 Claims, 6 Drawing Sheets

(56) References Cited

U.S. PATENT DOCUMENTS

2007/0296374 A1    12/2007  Baudesson .................... 318/772
2017/0230027 A1*  8/2017  Oswald ................ H02M 1/126

FOREIGN PATENT DOCUMENTS

| EP | 2 482 437 | 8/2012 |
| EP | 3 109 987 | 12/2016 |
| JP | 2001 197665 | 7/2001 |
| WO | 2003 105328 | 12/2003 |

OTHER PUBLICATIONS

Search Report for EP Application No. 20189369.0, 7 pages, Oct. 20, 2021.

* cited by examiner

POWER CONVERTER WITH COMMON MODE FILTER

CROSS-REFERENCE TO RELATED APPLICATIONS

This application is National Stage Application of a U.S. International Application No. PCT/EP2021/065294 filed Jun. 8, 2021, which designates the United States of America, and claims priority to EP application No. 20189369.0 filed Aug. 4, 2020, the contents of which are hereby incorporated by reference in their entirety.

TECHNICAL FIELD

The present disclosure relates to power converters. Various embodiments of the teachings herein include converter devices for converting between a first and a second electrical voltage and having a common mode filter device.

BACKGROUND

Power converters are used in industrial applications primarily as active rectifiers which generate a DC voltage out of the AC voltage of a connected public power supply grid or they are used as power inverters which, from a DC voltage, feed AC voltage into the public power supply grid, for example in applications in solar energy plants or battery banks. With regard to clarity of terminology, the following description is directed to the exemplary case of a rectifier having a power flow from the public power supply grid to power-consuming loads on the DC voltage side, but applies equally to a power inverter having a reverse power flow and to bidirectional power converters.

Power converters, in particular of the type used for industrial applications, must be equipped with line filters in order to maintain line-conducted interference within the limits of the respective applicable standards. As well as the line filter, some power converters additionally possess a filter on the DC voltage side which is intended to attenuate noise components from the external electrical components on the DC voltage side.

The sources of interference are differentiated into differential mode (DM) noise and common mode (CM) noise. The suppression of common mode noise frequently represents a particular challenge in this case. The loads connected on the DC voltage side have a major impact on the common mode noise behavior of the power converter and must therefore be taken into account in the configuration of the filters. However, the type, number and electrical characteristics of the loads are unknown in most cases and can be different in each application. Furthermore, the loads are connected to the power converter by way of lines of unknown length. The possible line lengths range in this case from approx. one meter up to several hundred meters.

As a result of parasitic inductances such as those of the lines and parasitic capacitances, for example of the loads and also of the power converter itself, a system which is capable of electrical oscillation with regard to common mode noise can be produced in this case, which system is referred to in the following as a common mode resonant circuit. The filter components are also part of this system. The common mode resonant circuit can have a plurality of different resonant frequencies. Each of these resonant frequencies can be excited by any source of interference in the network composed of power converter and loads. Exciting noise components are greatly amplified if no adequate damping is present. By damping is understood that a noise component is converted at least to some extent into heat, analogously to an ohmic resistor which is effective at the frequency of the noise component.

The line filter of the power converter is in this case required to suppress not only the causes of interference of the power converter itself to an adequate extent, but also all the noise components generated by the network, including those caused by the common mode resonant circuit. It is known to use additional filter stages in order to prevent oscillations being excited at resonant frequencies. A disadvantageous aspect of this solution is that, aside from additional costs, installation volume and unwanted differential-mode losses, each further filter stage also generates further resonance points of the common mode resonant circuit.

It is further known to reduce the common mode noise using EMC ferrites as common mode filter components. However, in the case of installations on an industrial scale, it is possible that resonant frequencies of the common mode resonant circuit lie significantly below 1 MHz. In this frequency range, filter components such as EMC ferrite beads, for example, often do not provide adequate damping, but have an almost purely inductive effect. The same typically applies to additional filter stages, which at such frequencies frequently constitute only a system composed of reactances, which often likewise cause a shifting of the resonance points or are intended to prevent the amplified noise components from propagating as far as the line side. However, such measures do not prevent inadequately damped resonance points from being present.

SUMMARY

The teachings of the present disclosure include power converters in which the disadvantages cited in the introduction are mitigated. For example, some embodiments include a power converter (10) comprising a converter device (12) for converting between a first and a second electrical voltage and a common mode filter device (16) having a common mode transformer (21), wherein the common mode transformer (21) has at least two first windings (221 . . . 223) arranged equidirectionally on a common core (81, 91) and coupled in series into electrical conductors (17) connected to the converter device (12), wherein a second winding (24) which is connected to a frequency-selective passive damping circuit (26, 31, 41, 51, 61, 71) is arranged on the common core (81, 91).

In some embodiments, the frequency-selective passive damping circuit (26, 31, 41, 51, 61, 71) comprises at least one capacitor (262, 43, 53, 65, 72) and/or at least one inductor (33, 44, 54).

In some embodiments, the frequency-selective passive damping circuit (26, 31, 41, 51, 61, 71) comprises a resistor (261, 32, 42, 52, 62, 64) in the current path between the terminals of the second winding (24).

In some embodiments, the common mode filter device (16) is arranged on the line side of the converter device (12).

In some embodiments, the common mode filter device (16) comprises a common mode choke (125).

In some embodiments, the common mode filter device (16) comprises capacitors (124) connected from the electrical lines (17) to a reference potential which, together with the common mode choke (125) and the common mode transformer (21), form an LCL filter or which, together with the common mode choke and the common mode transformer (21), form an LC filter.

In some embodiments, the common core (81, 91) is a ring-shaped core.

In some embodiments, the common core (81, 91) has a central bar (92) with an air gap.

In some embodiments, the frequency-selective passive damping circuit (26, 31, 41, 51, 61, 71) has a series circuit comprising a resistor and a capacitor or a resistor (32) and an inductor (33).

In some embodiments, the frequency-selective passive damping circuit (26, 31, 41, 51, 61, 71) has a series circuit comprising a resistor (42) and a capacitor (43) and an inductor (44).

In some embodiments, the frequency-selective passive damping circuit (26, 31, 41, 51, 61, 71) has a parallel circuit composed of a resistor (52), a capacitor (53) and an inductor (54).

In some embodiments, the frequency-selective passive damping circuit (26, 31, 41, 51, 61, 71) has a series circuit comprising a resistor (62) and a parallel circuit composed of a capacitor (65) with a resistor (64).

In some embodiments, the frequency-selective passive damping circuit (26, 31, 41, 51, 61, 71) additionally comprises a series-connected capacitor (72).

In some embodiments, the frequency-selective passive damping circuit (26, 31, 41, 51, 61, 71) comprises a first frequency-selective subcircuit having a first cutoff frequency or resonant frequency and a second frequency-selective subcircuit connected in parallel with the first subcircuit and having a second cutoff frequency or resonant frequency that is different from the first.

BRIEF DESCRIPTION OF THE DRAWINGS

The teaching herein are explained in more detail below in connection with exemplary embodiments and with reference to the figures of the drawing, in which.

DETAILED DESCRIPTION

In some embodiments of the teachings herein, a power converter comprises a converter device for converting between a first and a second electrical voltage. The converter device can be for example one or more parallel-connected half-bridges, each having two or more power semiconductors, which perform the conversion of the voltages by means of a suitable control method, for example by means of pulse width modulation.

The power converter further comprises a common mode filter device. The common mode filter device has a common mode transformer, the common mode transformer having at least two first windings arranged equidirectionally on a common core and coupled in series into electrical conductors connected to the converter device. A second winding is also arranged on the common core. The second winding is connected to a frequency-selective passive damping circuit.

A damping circuit coupled by means of a transformer is suitable for providing one or more of the occurring resonance points of the common mode resonant circuit with adequate damping. By damping circuit is understood in the present context a circuit which generates damping effect analogous to a resistor disposed in the current path, i.e. a circuit which draws energy from flowing current and in particular from an oscillation, for example by means of a conversion into heat, as accomplished by a resistor.

In the simplest case, the damping circuit can have a resistor for this purpose. The resistor can necessarily be positioned in the current path if, for example, the entire damping circuit is a series circuit with a resistor. However, the resistor can also be partially bridged or coupled in a frequency-selective manner if the resistor is connected for example in parallel with a capacitor and parallel to an inductor and/or if the resistor is connected in series with a capacitor and/or an inductor.

By frequency-selective is understood in the present context that the damping circuit exhibits a frequency-dependent behavior, for example comprises a high-pass, low-pass, band pass or a band stop filter. The effect advantageously achieved thereby is that the damping does not act uniformly on all frequencies but only occurs in an attenuated form for a part of the spectrum, i.e. only slightly or very slightly affects a part of the spectrum. Negative effects such as unwanted additional losses are avoided as a result.

As a result of the arrangement of the damping circuit on the secondary side of the common mode transformer, also only common mode components reach the damping circuit, while differential mode components are not transmitted into the damping circuit. Losses due to the unwanted damping of differential mode components are avoided as a result.

In some embodiments, the frequency-selective passive damping circuit can comprise at least one capacitor and/or at least one inductor. These components provide the frequency selectivity in a simple and passive manner. The cited high-pass, low-pass or other frequency-selective circuits are produced from parallel and/or series circuits composed of capacitor and/or inductor.

By passive is understood in the present context that the elements employed in the damping circuit require no control of any kind. Power semiconductors such as IGBTs, field-effect or bipolar transistors are regarded generally as non-passive components since in most cases they require their control contact, i.e. the gate electrode, to be activated in order to perform their function. The extra cost for the use of such active components is substantially higher than that for the use of purely passive components.

In some embodiments, the common mode filter device can have an additional common mode choke. In other words, the common mode filter device comprises the common mode transformer and in addition a further common mode choke, which for its part comprises three windings arranged equidirectionally on magnetic core. This allows the inductance of the common mode choke to be set independently of the common mode transformer. The common mode filter device can in this case comprise capacitors connected from the electrical lines to a reference potential. These, together with the common mode choke and the common mode transformer, form an LCL filter.

In some embodiments, the common core can be configured in such a way that its leakage inductance is intentionally increased. There are many possible ways of doing this. For example, a core constructed in the shape of a rectangle or square can have a central bar with an air gap. In this way the function of an otherwise separately present common mode choke and the function of the common mode transformer can be combined in a single component. This enables space and weight to be saved for the power converter since it is precisely the inductive components in power converters that are often large and heavy compared to other components such as power semiconductors.

The frequency-selective passive damping circuit can comprise a series circuit with a resistor and a capacitor or a resistor and an inductor or a resistor, an inductor and a capacitor. The damping circuit may also comprise precisely these elements only, i.e. in other words have no further electrical components in addition.

In some embodiments, the frequency-selective passive damping circuit can comprise a parallel circuit composed of a resistor, a capacitor and an inductor or consist of this. The frequency-selective passive damping circuit can further comprise a series circuit with a resistor and a parallel circuit composed of a capacitor with a resistor. In addition thereto, the damping circuit can have a series-connected capacitor.

More complex circuits comprising more elements than those described can also be constructed, but in terms of their function these often correspond to more simple layouts and can be reduced to these by means of circuit analysis. As a result of the different circuit types, three different types of behavior are created on a frequency-selective basis, i.e. as a function of a considered frequency, with which the damping circuit interacts in different ways. In this case the effective ranges are not sharply delimited but transition into one another, such as is known for high-pass, low-pass and other such circuits. Furthermore, the types of behavior are also not absolute, but there is always a mixture present, though in certain frequency ranges this is dominated by one of the types of behavior.

With the first type of behavior, the effect of the damping circuit is such that the current flow is largely blocked. In the case of a series circuit composed of a resistor with capacitor, for example, this happens at low frequencies. In this case the second winding, which forms the secondary side of the common mode transformer, is open. A current flow is consequently largely inhibited for the second winding, as a result of which the common mode transformer acts to a large extent like a more simple common mode choke.

With the second type of behavior, the effect of the damping circuit is such that its ends are largely short-circuited. In the case of a parallel circuit of a resistor with a capacitor and an inductor, for example, this happens at low and at high frequencies, i.e. at all frequencies that do not lie close to the resonant frequency resulting for this resonant circuit. In this case the second winding is therefore practically short-circuited and the common mode transformer has an inductance which results from the existing first windings and the second winding, i.e. has changed compared to the first type of behavior.

With the third type of behavior, the damping circuit has an ohmic effect to a considerable extent. In this case the main current path through the circuit typically has a series-connected resistor. In the case of a parallel circuit composed of a resistor with a capacitor, for example, this happens at low frequencies, at which the capacitor blocks the current flow almost completely and consequently does not bridge the resistor. In this case the second winding is closed by means of a circuit acting at least in part ohmically and exerts a damping effect with respect to all current components at low frequencies.

Thus, by means of the described damping circuits and other analogously acting damping circuits, components of the current can be damped on a frequency-selective basis, in particular current components at frequencies belonging to common mode resonant circuits. In this case, the damping circuit may be configured in such a way that current components that are not damped, i.e. those that do not belong to common mode resonant circuits, are affected as little as possible.

In some embodiments, the frequency-selective passive damping circuit comprises a first frequency-selective subcircuit having a first cutoff frequency or resonant frequency and a second frequency-selective subcircuit connected in parallel with the first subcircuit and having a second cutoff frequency or resonant frequency that is different from the first. This enables different resonant frequencies that occur in the network composed of power converter and load to be provided with a damping means in a targeted manner. Other frequencies are only slightly affected by the damping.

In some embodiments, the common mode filter device is arranged on the line side of the converter device, though it can also be arranged on the load side thereof, for example as part of a DC filter. The common core can be a ring-shaped core or a square- or rectangle-shaped core.

Figure 1:
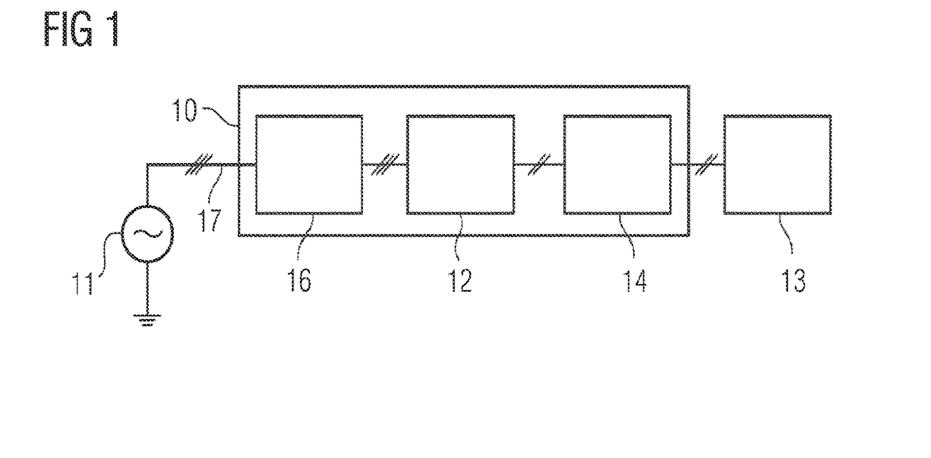
FIG. 1 shows a circuit diagram of a system comprising a power converter used as a rectifier with a line filter incorporating teachings of the present disclosure.

The simplified schematic circuit diagram of FIG. 1 illustrates the layout of a system comprising a power converter 10 which is an exemplary embodiment of the teachings of the present disclosure. The power converter 10 is connected on the input side to a three-phase public power supply grid 11. On the output side, the power converter 10 is connected to a load 13 which can be for example part of an industrial process installation such as a heating or electrolysis plant. It is of course possible that the merely indicated load 13 is itself an entire network composed of further arrangements. The designations input side and output side are also used only for the sake of simplicity. In applications, the power flow can be reversed or even bidirectional, so it is not even possible to make the differentiation into input side and output side of the power converter 10.

The power converter 10 is used in this system as an active rectifier and is embodied as such, specifically the converter device 12, which performs the actual conversion of the input-side three-phase supply voltage into a single-phase DC voltage. On the DC side, the power converter 10 has a DC filter 14 which is intended to prevent noise generated by the load 13 being propagated to the public power supply grid 11.

Figure 2:
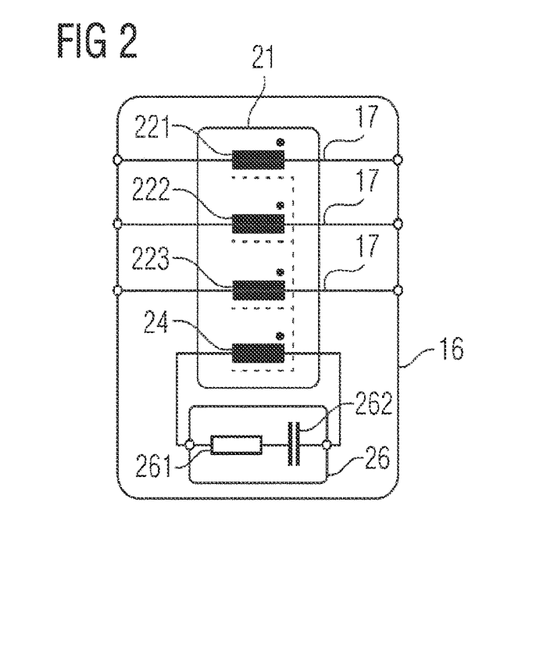
FIG. 2 shows the line filter with a damping circuit incorporating teachings of the present disclosure.
Figure 10:
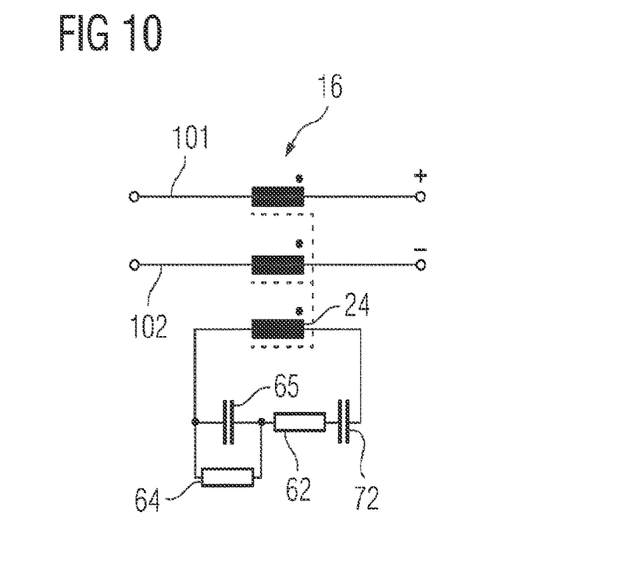
FIG. 10 shows an embodiment of the line filter at a single-phase terminal incorporating teachings of the present disclosure.
Figure 11:
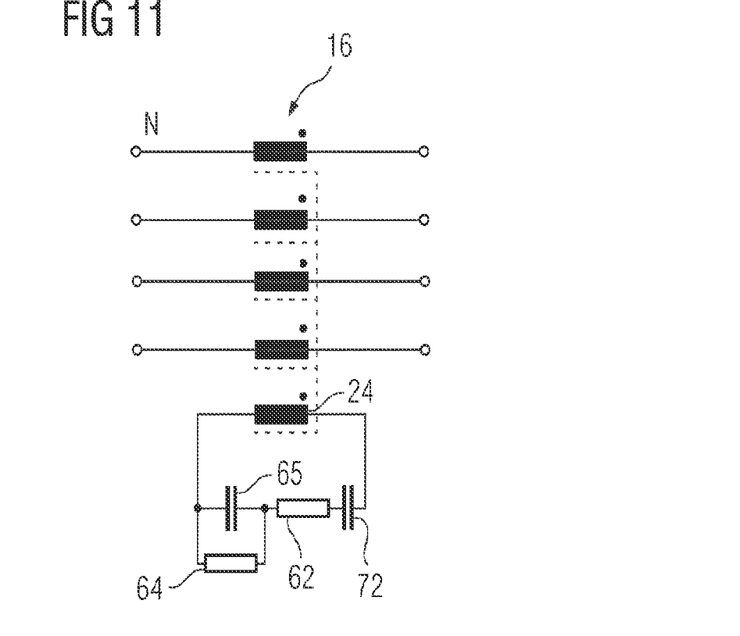
FIG. 11 shows an embodiment of the line filter at a three-phase terminal with neutral conductor incorporating teachings of the present disclosure.

The power converter 10 further comprises a line filter 16. The line filter 16 serves to keep line-conducted interference within the limits prescribed by standards. Various embodiments can be used for the line filter 16, resulting n a plurality of exemplary embodiments of the invention. A selection of such embodiments is shown in FIGS. 2, 10 and 11. The line filter 16 is in this case connected to or into the phase lines 17, which establish the connection between the public power supply grid 11 and the power converter 10.

It should be noted in this case that as a result of parasitic inductances such as those of the lines leading to the load 13, for example, and parasitic capacitances, for example of the load 13, but also of the power converter 10 itself and even of the components of the filters 14, 16 with regard to common mode noise, a system which is capable of electrical oscillation is created, which system is referred to in the following as a "common mode resonant circuit". The common mode resonant circuit can have a plurality of different resonance points. Any of these resonance points can be excited by any source of interference in the network formed by power converter 10 and load 13. If that is the case, the exciting noise component is considerably amplified if no adequate damping is present. The line filter 16 of the power converter 10 must not only adequately suppress the noise of the power converter 10 itself, but also all noise components generated by the network, in particular those resulting due to the common mode resonant circuit.

The actually occurring common mode resonant circuits and their resonance points are dependent on the actual layout of the network composed of power converter 10 and load 13. A prediction without knowing the properties of the load 13 is therefore not sufficient. Rather, the resonance points must be identified by means of simulation or alternatively by measurement with precise knowledge of the actual layout.

FIG. 2 shows an electrical circuit diagram for a first embodiment for the line filter 16, which can advantageously. The line filter 16 comprises a common mode transformer 21. The common mode transformer 21 comprises three first windings 221, 222, 223 arranged on a common core 81 and coupled equidirectionally into one of the phase lines 17 in each case. A second winding 24 is also arranged on the common core 81.

Figure 8:
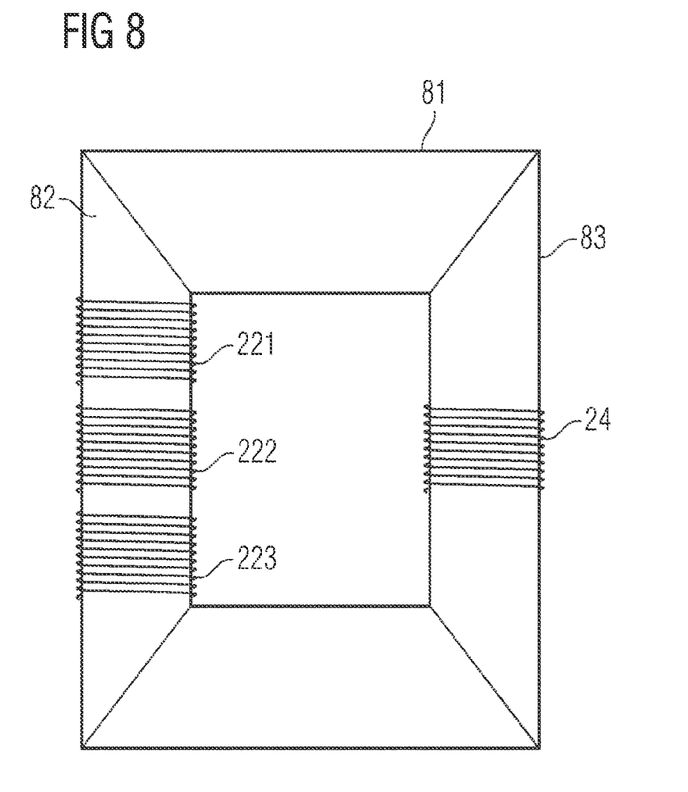
FIG. 8 shows a layout of a common mode transformer incorporating teachings of the present disclosure.

A possible arrangement of the windings 221 . . . 223, 24 is shown in FIG. 8. FIG. 8 shows the common core 81, which in this example is substantially square and constructed analogously to a core composed of two U cores. The common core 81 is free of an air gap in this case. The first windings 221 . . . 223 are arranged in the same winding direction on a first leg 82 of the common core 81, while the second winding 24, i.e. the secondary side of the common mode transformer 21, is arranged on a second leg 83 of the common core 81. The winding direction of the second winding 24 is arbitrary in this case.

The second winding 24 is connected to a first variant of a passive and frequency-selective damping circuit 26, which comprises a series circuit composed of a resistor 261 and a capacitor 262. This series circuit acts as a high-pass filter. In this example, the components are chosen such that the damping circuit 26 acts virtually like an open circuit at frequencies of less than 100 kHz. The terminals of the second winding 24 are substantially open as a result and the second winding 24 exerts only a minor effect in the common mode transformer 21. The common mode transformer 21 therefore acts like a common mode choke in the specified range of low frequencies.

At frequencies significantly above 100 kHz, the capacitor 262 no longer exerts a blocking effect and the damping circuit 26 exhibits a substantially ohmic behavior. The cutoff frequency of 100 kHz is chosen in this example such that it lies precisely in the range of an exemplary resonance point at 121 kHz. As a result, the damping ohmic effect of the damping circuit 26 is actually achieved only roughly at the resonance point, whereas at lower frequencies the influence of the second winding 24 vanishes.

Figure 3:
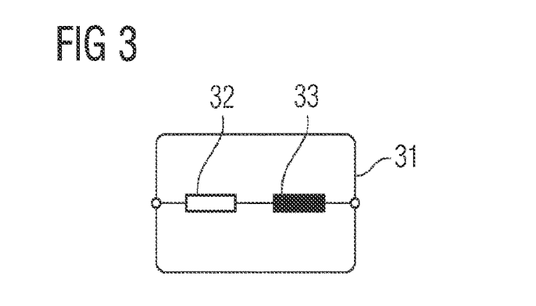
FIGS. 3 to 7 show electrical circuit diagrams for embodiments of the damping circuit incorporating teachings of the present disclosure.

FIG. 3 shows a further exemplary embodiment of a damping circuit incorporating teachings of the present disclosure. The passive and frequency-selective damping circuit 31 is to be used in the line filter 16 at the position of the damping circuit 26 and replaces the latter. The damping circuit 31 comprises a series circuit composed of a resistor 32 and an inductor 33. Together, these form a low-pass filter.

At frequencies below the cutoff frequency, i.e. in particular at the resonance point, the damping circuit 31 therefore exerts a largely ohmic, i.e. damping, effect on the coupled-in current components. As a result, a suitable damping is achieved for the common mode resonant circuit and consequently an amplification of corresponding current components is prevented. Above the cutoff frequency, the inductor 33 has a blocking effect on current components and the common mode transformer 21 acts once again like a common mode choke without the second winding 24.

Figure 4:
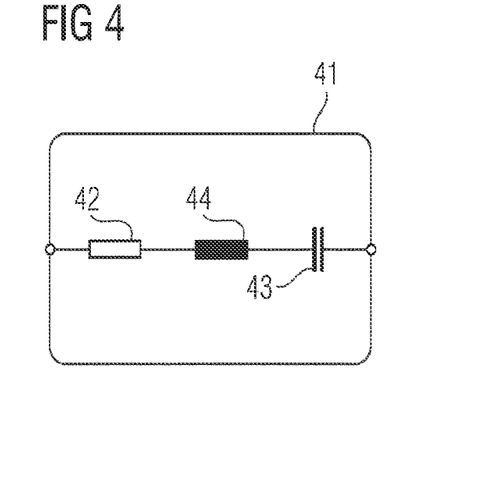

FIG. 4 shows a further possible implementation. The passive and frequency-selective damping circuit 41 of FIG. 4 comprises a series circuit composed of a resistor 42, a capacitor 43 and an inductor 44. The inductor 44 of the damping circuit 41 ensures that at a sufficiently high frequency the current flow between the terminals of the second winding 24 is virtually blocked, thus constituting high a resistance at high frequencies. Similarly, the capacitor 43 of the damping circuit 41 represents a high resistance at sufficiently low frequencies.

A low to very low resistance of these two components is produced only in a range around a frequency resulting as the resonant frequency of the resonant circuit composed of capacitor 43 and inductor 44 such that the resistor 42, which exerts a damping effect for oscillations in the range of the resonant frequency, is critical for the current flow.

In contrast to the high-pass and low-pass filters of FIGS. 2 and 3, a band pass filter is therefore realized by means of the damping circuit 41, the passed frequency range experiencing a damped conducting state. By means of the damping circuit 41, resonance points that are precisely known can be provided with suitable damping. At frequencies outside of the resonance range, the damping circuit 41 causes the second winding 24 to be substantially open.

Figure 5:
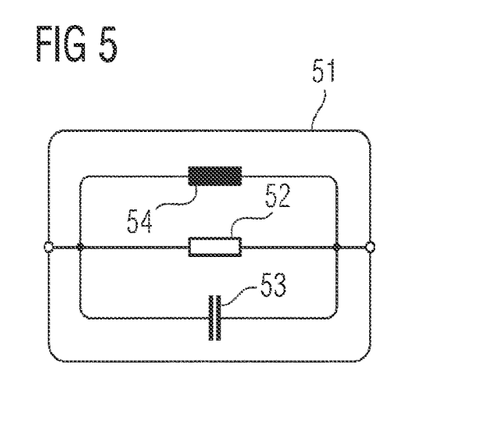

FIG. 5 shows a further possible implementation. The passive and frequency-selective damping circuit 51 of FIG. 5 comprises a parallel circuit composed of a resistor 52, a capacitor 53 and an inductor 54.

The inductor 54 of the damping circuit 51 ensures that at a sufficiently low frequency the terminals of the second winding 24 are approximately shorted. As a result, the resistor 52 disposed directly between the terminals of the second winding 24 is largely bridged and a very low damping effect is produced. The capacitor 53 of the damping circuit 51 in turn provides a bridging of the resistor 52 at a sufficiently high frequency. As a result, a low damping effect of the damping circuit 51 is established at high frequencies also. The resistor 52 is the critical current-conducting element of the damping circuit 51 only in a frequency range which can be specified by means of the choice of the components and provides a damping of current components of the corresponding frequencies.

In contrast to the high-pass and low-pass filters of FIGS. 2 and 3, a kind of band stop filter is therefore realized by means of the damping circuit 51, the frequency range that is blocked being conducted through the resistor 52 and consequently a damped conducting state being produced. As a result, a resonance point or else a number of resonance points lying not too far apart from one another can be provided with a damping means.

At frequencies outside of the blocked band, the damping circuit 51 causes the second winding 24 to be substantially shorted. As a result, the ohmic behavior of the resistor 52 recedes into the background for the properties of the common mode transformer 21 and the inductance of the second winding 24 is preserved for the properties of the common mode transformer 21.

Figure 6:
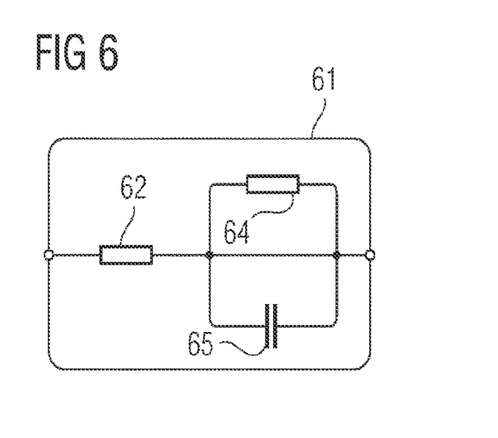

A further possible embodiment is shown in FIG. 6. The passive and frequency-selective damping circuit 61 of FIG. 6 comprises a series circuit composed of a first resistor 62 and a parallel circuit comprising a second resistor 64 and a capacitor 65. Since the damping circuit 61 offers an ohmic current path at all frequencies, a damping effect also takes place at all frequencies. Because the capacitor 65 is connected in parallel with the second resistor 64, the second resistor 64 is bridged at high frequencies and the damping passes only through the first resistor 62. Ultimately, therefore, a frequency-dependent damping effect results with a first, smaller resistance value at high frequencies and a larger summed resistance value at low frequencies.

Figure 7:
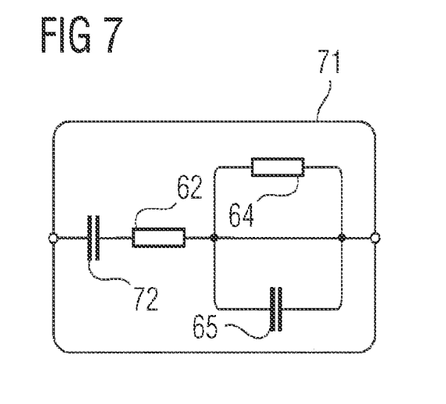

The damping circuit 71 of FIG. 7 can be used in order to inhibit a damping by the damping circuit 61 at low frequencies. This corresponds to the damping circuit 61 of FIG. 6 but is supplemented by a second capacitor 72 which is connected in series with the already existing elements. The resulting high-pass effect roughly corresponds to that described for the damping circuit 21 of FIG. 2.

Further exemplary embodiments of the teachings herein may be produced by connecting several of the described variants for damping circuits in parallel. By a different choice of components and consequently different cutoff frequencies or resonant frequencies, a behavior can thus be formed by means of which different common mode resonant circuits are selectively damped and at the same time unwanted electrical losses are avoided. The connection to the second winding 24 in the common mode transformer 21 automatically causes only common mode noise to be transmitted into the damping circuit and affected.

FIG. 10 shows the connection of the line filter 16 and specifically of the common mode transformer 21 in a single-phase environment. In this case the common mode transformer 21 comprises two first windings which are incorporated into the positive pole 101 and the negative pole 102 of the single-phase system. The damping circuit in FIG. 10 corresponds by way of example to that of FIG. 7.

FIG. 11 shows the connection of the common mode transformer 21 in a three-phase environment with neutral conductor. In this case the common mode transformer 21 comprises four first windings which are incorporated into phase lines and the neutral conductor. The damping circuit in FIG. 11 likewise corresponds by way of example to that of FIG. 7.

Figure 12:
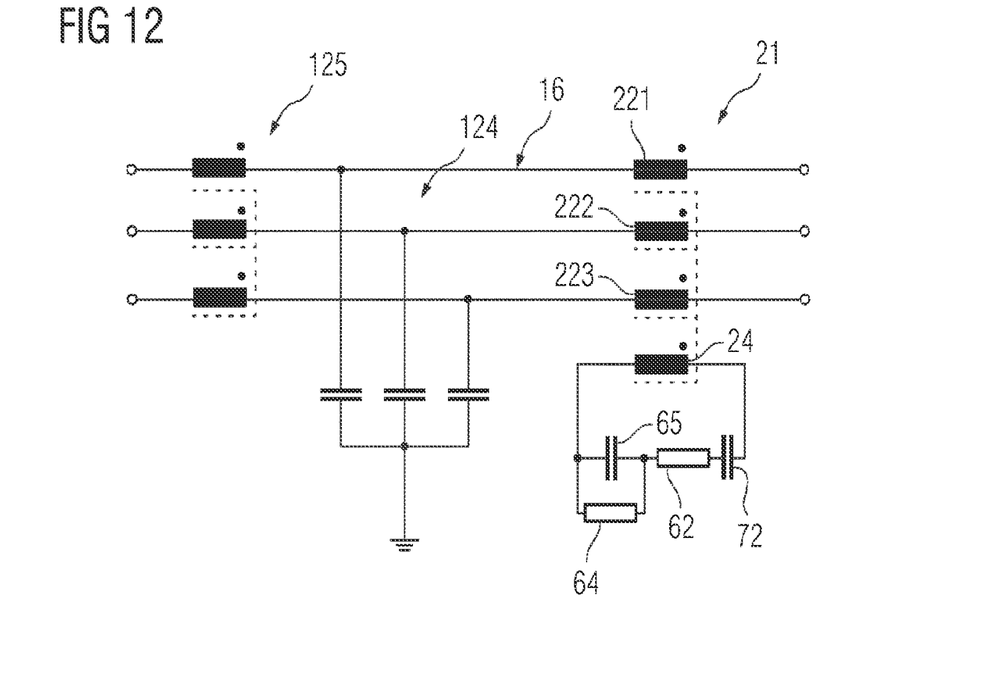
FIG. 12 shows a layout of the line filter with an LCL filter incorporating teachings of the present disclosure.

FIG. 12 shows a layout for the line filter 16 in a three-phase system in which an LCL filter is formed from the common mode transformer 21, a capacitor system 124 and a common mode choke 125. The LCL filter is therefore extended compared to known LCL filters by the second winding 24 and the connected damping circuit.

Figure 9:
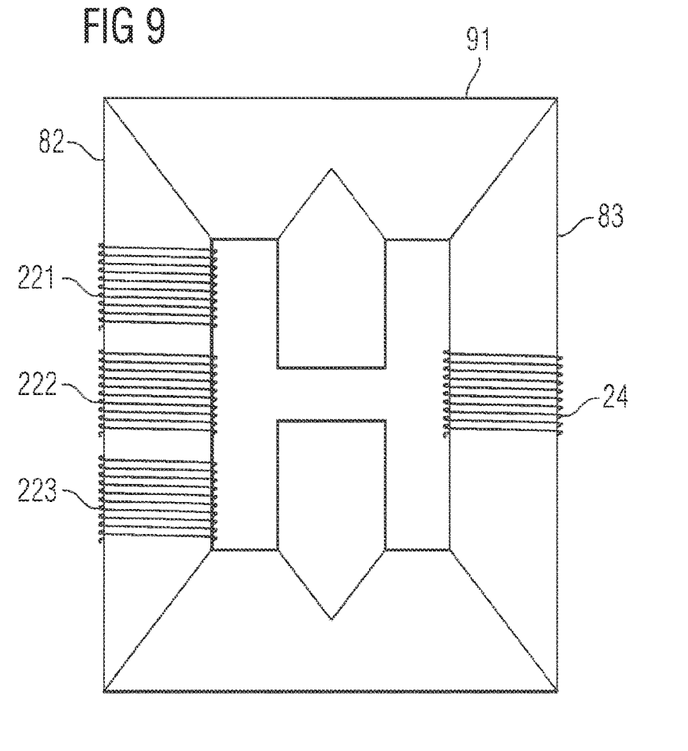
FIG. 9 shows a further layout of a common mode transformer incorporating teachings of the present disclosure.

In some embodiments, the functions of the common mode transformer 21 and the common mode choke 125 are realized in a single module insofar as an embodiment without an intermediately inserted capacitor system 124 is used. For this purpose, a magnetic core 91 is used in the common mode transformer 21, as is shown by way of example in FIG. 9. The core 91, like the common core 81, is constructed in a square or rectangular shape. In contrast to the core 81, however, the core 91 comprises an additional leg in the form of the central bar 92, the central bar 92 having an air gap and being free of windings. By means of the central bar 92, an increased leakage inductance is achieved compared to the common core 81. This results in parts in an effect analogous to the common mode choke 125, the ratio of the inductances being adjustable by means of the design of the central bar 92.

Figure 13:
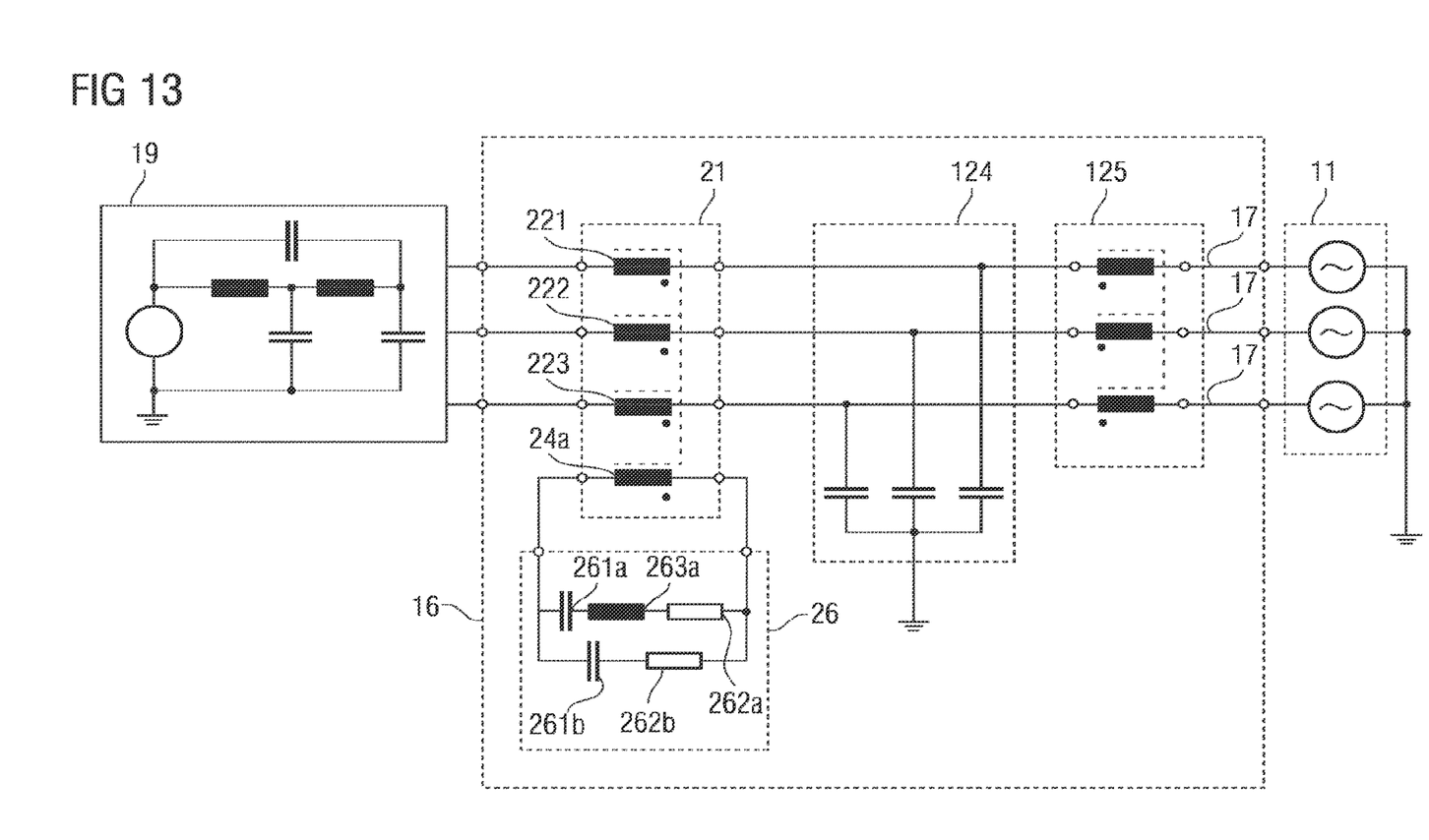
FIG. 13 shows an exemplary system with line filter incorporating teachings of the present disclosure.

FIG. 13 shows an example system incorporating teachings of the present disclosure. The line filter 16 is a common mode filter. In real systems, the line filter 16 can also comprise further components in addition. The common mode filter must ensure that the noise emitted into the public power supply grid 11 complies with the specified standard limits. FIG. 13 additionally shows an interference system 19 consisting of (at least one) source of interference and often a complex RLC network which is formed, among other things, by the load 13 and the DC filter 14. It is usual that the impedance of the interference system 19 is subject to major fluctuations in the frequency range between 9 kHz and 40 MHz considered for line-conducted interference. It is frequently the case that the impedance of the interference system 19 varies in this range between capacitive and inductive. Referring to FIG. 13, it can be seen that the series circuit composed of the interference system 19, the common mode transformer 21 and the capacitor systems 124 forms a first and in this case the only resonant circuit. The resonance points of this resonant circuit can be damped with the illustrated embodiment of the invention.

Example values are assumed in the following: The windings 221, 222, 223, 24 have a self-inductance of 10 mH and an almost ideal coupling to one another. The capacitors 124 are assumed as ideal with values of 10 nF in each case. Let the common mode choke 125 be assumed in this case by way of example to have a self-inductance of the windings of 10 mH.

The first resonance point of the system is now determined by means of simulation or calculation. It is assumed here by way of example that said point is located at approximately 10 kHz. This resonance point is to be selectively damped by means of a filter branch according to FIG. 4 in order to prevent the possibility of said resonance point being excited. The values of the electrical components 261a, 262a, 263a are to be configured such that the resonant circuit is adequately damped at approximately 10 kHz. In the following example, a possible dimensioning for 261 a is approximately 60 nF, for 263a approximately 5 mHz, and for 262a approximately 100 ohms.

The next resonance point of the system is now determined by means of simulation or calculation. In the high-frequency range, it frequently occurs in real-world practice that only a range in which a resonance point can be located can be determined. This is the case in particular when for example parasitic capacitances whose values are known only imprecisely are taken into account in the interference model.

It is assumed in the following that the system has further resonance points above 100 kHz, though these cannot be determined precisely. In this case it makes sense to extend the line filter 16 by the elements 261b and 262b. Approximately 2 nF for 261b and approximately 1 kohm for 262 represent a possible dimensioning.

In the exemplary configuration, the damping is below the threshold of −40 db, in particular in the range of the first resonance point, i.e. at approximately 10 kHz, and as of 100 kHz an additional damping results in the range of single db.

LIST OF REFERENCE SIGNS

10 Power converter
11 Public power supply grid
12 Converter device
13 Load
14 DC filter 16 Line filter
17 Phase lines
19 Interference system
21 Common mode transformer
221 . . . 223 First windings
24 Second winding
81 Common magnetic core
82, 83 Leg
26, 31, 41, 51, 61, 71 Damping circuit
261, 32, 42, 52, 62, 64 Resistor
262, 43, 53, 65, 72 Capacitor
33, 44, 54 Inductor
101, 102 Poles of the single-phase system
124 Capacitor system
125 Common mode choke
91 Magnetic core
92 Central bar

What is claimed is:

1. A power converter comprising:
a converter for converting between a first electrical voltage and a second electrical voltage;
a common mode filter having a common mode transformer;
wherein the common mode transformer has at least two first windings arranged in the same direction on a common core and coupled in series into electrical conductors connected to the converter device; and
a second winding connected to a frequency-selective passive damping circuit arranged on the common core;
wherein the frequency-selective passive damping circuit includes one of: (a) a series circuit comprising a resistor and a capacitor and an inductor, (b) a parallel circuit composed of a resistor, a capacitor, and an inductor, and (c) a series circuit comprising a first resistor and a parallel circuit composed of a capacitor and a second resistor.

2. The power converter as claimed in claim 1, wherein the frequency-selective passive damping circuit comprises a capacitor and/or an inductor.

3. The power converter as claimed in claim 1, wherein the frequency-selective passive damping circuit comprises a resistor in a current path between terminals of the second winding.

4. The power converter as claimed in claim 1, wherein the common mode filter device is arranged on a line side of the converter device.

5. The power converter as claimed in claim 1, wherein the common mode filter device comprises a common mode choke.

6. The power converter as claimed in claim 5, wherein the common mode filter device comprises capacitors connected from the electrical lines to a reference potential which, together with the common mode choke and the common mode transformer, form an LCL filter or which, together with the common mode choke and the common mode transformer, form an LC filter.

7. The power converter as claimed in claim 1, wherein the common core comprises a ring-shaped core.

8. The power converter as claimed in claim 1, wherein the common core has a central bar with an air gap.

9. The power converter as claimed in claim 1, wherein the frequency-selective passive damping circuit additionally comprises a series-connected capacitor.

10. A power converter comprising:
a converter for converting between a first electrical voltage and a second electrical voltage;
a common mode filter having a common mode transformer;
wherein the common mode transformer has at least two first windings arranged in the same direction on a common core and coupled in series into electrical conductors connected to the converter device; and
a second winding connected to a frequency-selective passive damping circuit arranged on the common core;
wherein the frequency-selective passive damping circuit comprises a first frequency-selective subcircuit having a first cutoff frequency or resonant frequency and a second frequency-selective subcircuit connected in parallel with the first subcircuit and having a second cutoff frequency or resonant frequency that is different from the first cutoff frequency or resonant frequency.

* * * * *